(12) United States Patent
Moradell et al.

(10) Patent No.: US 6,971,620 B2
(45) Date of Patent: Dec. 6, 2005

(54) ADJUSTMENT MECHANISM FOR A VEHICLE SEAT SLIDE

(75) Inventors: Pierre Moradell, St Georges des Groseillers (FR); Patrick Mallard, Flers (FR)

(73) Assignee: Faurecia Sieges d'automobile S.A., Nanterre (FR)

( * ) Notice: Subject to any disclaimer, the term of this patent is extended or adjusted under 35 U.S.C. 154(b) by 46 days.

(21) Appl. No.: 10/384,323

(22) Filed: Mar. 7, 2003

(65) Prior Publication Data

US 2003/0173809 A1 Sep. 18, 2003

(30) Foreign Application Priority Data

Mar. 18, 2002 (FR) .................................. 02 03323

(51) Int. Cl.[7] .............................................. F16M 13/00
(52) U.S. Cl. ...................................... 248/422; 248/424
(58) Field of Search .................. 248/422, 424, 248/429, 430; 297/344.1, 311; 296/65.13, 296/65.12, 65.11, 65.15; 74/89.42, 409, 440

(56) References Cited

U.S. PATENT DOCUMENTS

| 4,609,337 | A | * | 9/1986 | Wichterle et al. ........... 425/145 |
| 4,729,703 | A | * | 3/1988 | Sato .............................. 411/5 |
| 4,872,903 | A | * | 10/1989 | Periou ....................... 74/89.38 |
| 5,048,786 | A | * | 9/1991 | Tanaka et al. ............... 248/429 |
| 5,048,886 | A | * | 9/1991 | Ito et al. .................. 296/65.14 |
| 5,393,028 | A | * | 2/1995 | Satoh et al. ................. 248/429 |
| 5,445,354 | A | * | 8/1995 | Gauger et al. ............... 248/429 |
| 5,467,957 | A | * | 11/1995 | Gauger ....................... 248/429 |
| 5,769,377 | A | * | 6/1998 | Gauger ........................ 248/429 |
| 5,797,293 | A | * | 8/1998 | Chaban ..................... 74/89.36 |
| 5,797,576 | A | * | 8/1998 | Gauger ........................ 248/429 |
| 5,816,555 | A | * | 10/1998 | Ito et al. ..................... 248/429 |
| 5,860,319 | A | * | 1/1999 | Via ........................... 74/89.36 |
| 5,911,789 | A | * | 6/1999 | Keipert et al. ................ 74/493 |
| 5,941,494 | A | * | 8/1999 | Garrido ....................... 248/429 |
| 6,220,642 | B1 | * | 4/2001 | Ito et al. .................. 296/65.14 |
| 6,260,922 | B1 | * | 7/2001 | Frohnhaus et al. ......... 297/330 |
| 6,688,667 | B2 | * | 2/2004 | Nishimoto et al. ...... 296/65.15 |
| 2003/0052246 | A1 | * | 3/2003 | Hoshihara et al. .......... 248/430 |

FOREIGN PATENT DOCUMENTS

| DE | 846 647 | 8/1952 |
| DE | 39 19 378 | 12/1989 |
| EP | 0 375 842 | 7/1990 |
| FR | 2 796 013 | 1/2001 |
| WO | WO 99/63248 | 12/1999 |

\* cited by examiner

Primary Examiner—Robert P. Olszewski
Assistant Examiner—A. Joseph Wujciak
(74) Attorney, Agent, or Firm—McCracken & Frank LLP

(57) ABSTRACT

An adjustment mechanism for a slide of a motor vehicle seat, the adjustment mechanism comprising a worm screw, a first nut and a second nut rotatably receiving the worm screw, a support, and two resilient buffers received respectively between the first nut and the support, and between the second nut and the support. The adjustment mechanism further comprises a band forming a housing for receiving the two nuts and the two buffers and thereby forming a pre-assembled unit prior to being mounted on the support. The first and second nuts have tapped bores which have threads that start at different angular positions, so that screwing the worm screw into the nuts generates a gap between the first and second nuts.

8 Claims, 5 Drawing Sheets

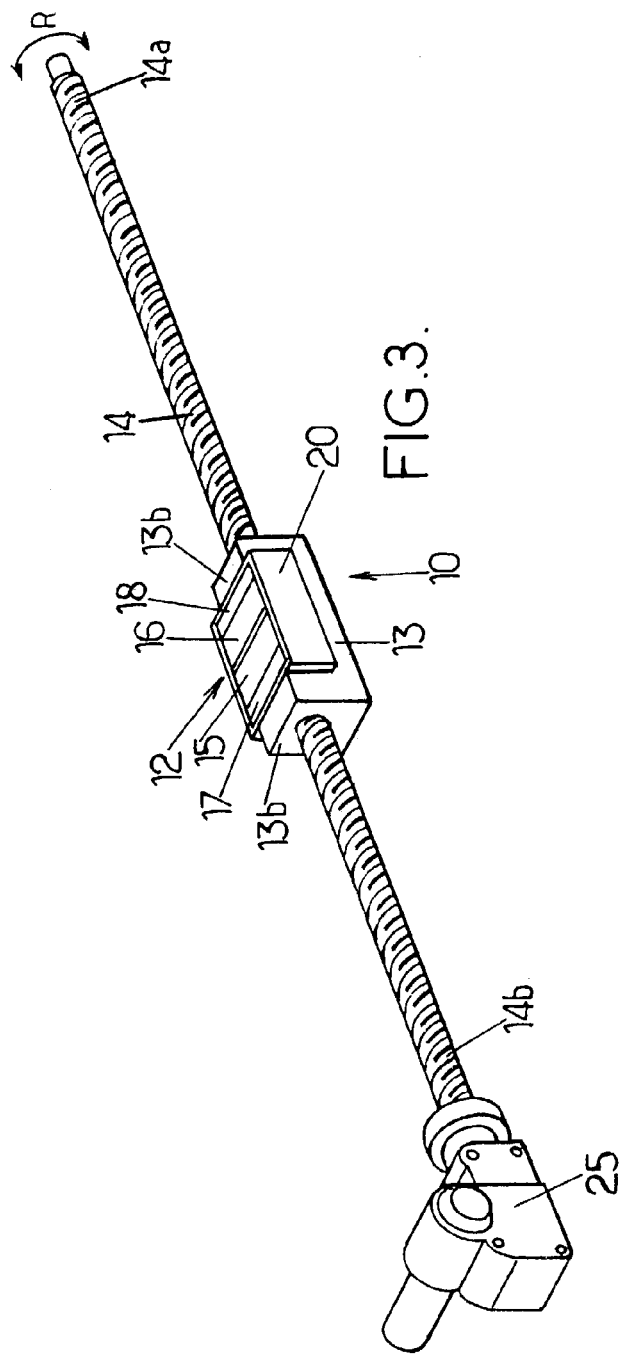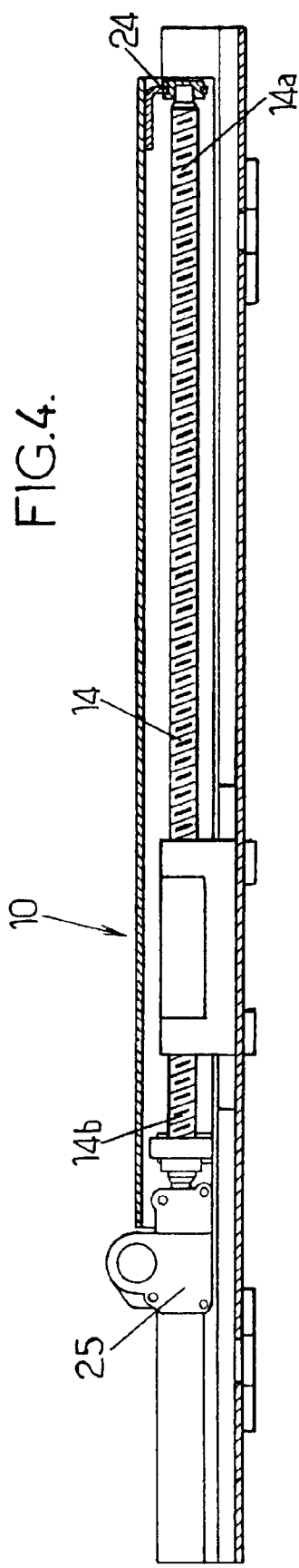

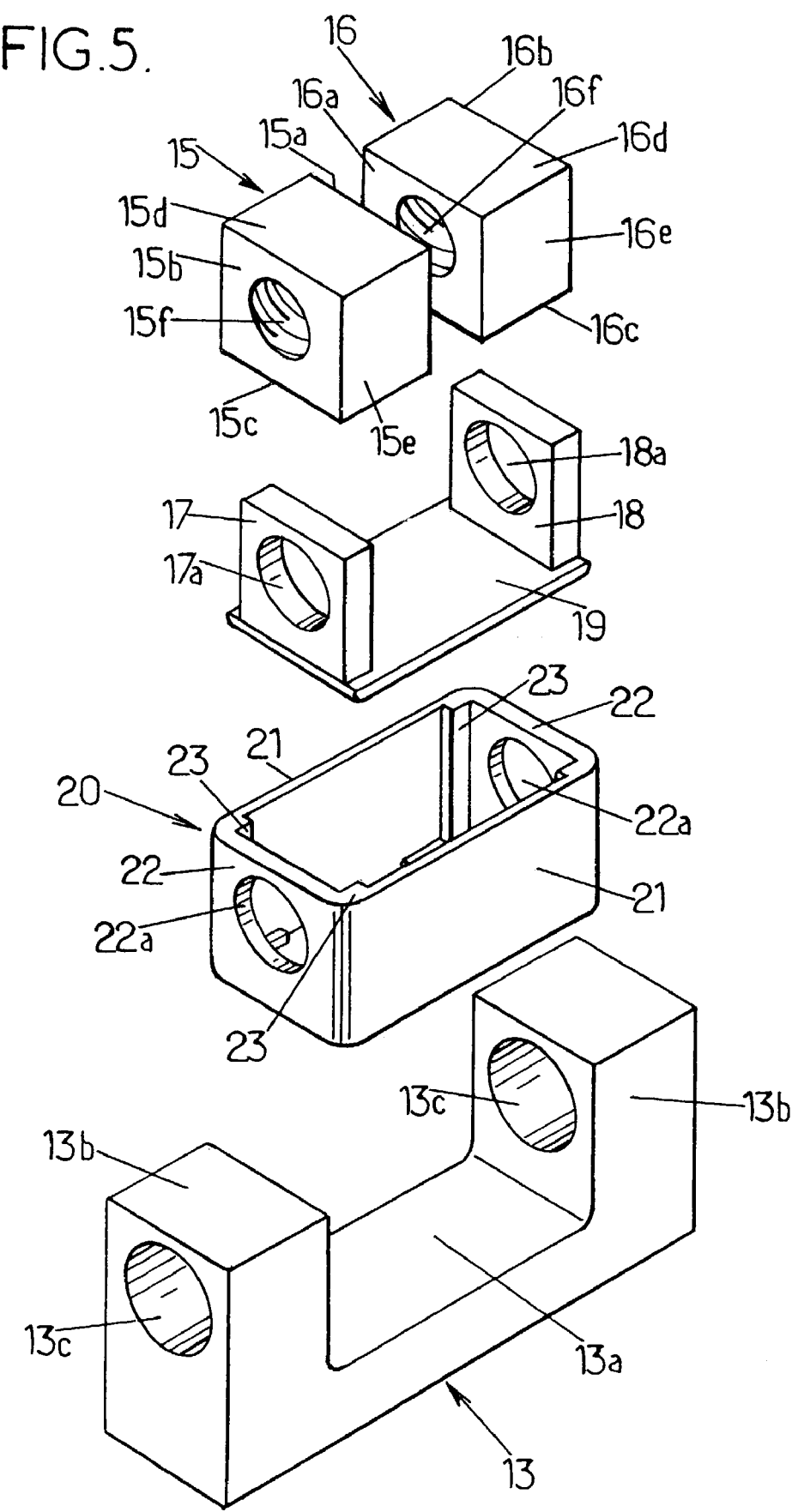

ADJUSTMENT MECHANISM FOR A VEHICLE SEAT SLIDE

FIELD OF THE INVENTION

The present invention relates to adjustment mechanisms for motor vehicle seat slides and to slides and seats equipped with such mechanisms.

BACKGROUND OF THE INVENTION

Generally, such a slide comprises a fixed rail designed to be secured to the vehicle, and a moving rail designed to support a seat proper of the seat and mounted to slide along a longitudinal axis along the fixed rail.

More particularly, the invention relates to an adjustment mechanism comprising:

a drive worm screw extending in a longitudinal direction;

a first nut and a second nut rotatably receiving the worm screw, the first and second nuts having respectively a first transverse face and a second transverse face, which faces are perpendicular to the longitudinal direction of the worm screw, the first and second transverse faces being disposed facing each other;

a support comprising a web from which first and second flanges extend that face each other and that co-operate with said web to form a recess for receiving the two nuts, the worm screw being mounted to turn relative to the support so as cause the screw and the support to move in translation relative to each other; and two resilient buffers received respectively between the first nut and the first flange of the support, and between the second nut and the second flange of the support.

Document DE 39 13 378 A1 describes an example of such an adjustment mechanism, in which, to enable the two nuts and the two resilient buffers to be assembled together, it is necessary to use a plurality of parts, thereby requiring relatively complex assembly and adjustment steps to be performed on the various parts.

OBJECTS AND SUMMARY OF THE INVENTION

An object of the present invention is to improve adjustment mechanisms of that type, in particular so as to make it easier to assemble them and thus to assemble worm screws and supports relative to each other while also enabling said nuts to move vertically, transversely, and longitudinally to a small extent in order to follow the movements of a worm screw while it is driving the moving rail during adjustment of the longitudinal position of a seat.

To this end, according to the invention, an adjustment mechanism of the type in question further comprises a band forming a housing for receiving the two nuts and the two buffers and thereby forming a pre-assembled unit prior to being mounted in the recess of the support, the first and second transverse faces of the first and second nuts being in abutment against each other prior to screwing the worm screw into the two nuts, and the first and second nuts have respective first and second tapped bores which, at the first and second transverse faces, have threads that start at different angular positions, so that screwing the worm screw into the nuts generates both a gap between the first and second nuts and elastic deformation of the two buffers, making it possible firstly to cause the threads of the first and second tapped bores to press against the worm screw, and secondly to cause the band to press against the first and second flanges of the support.

By means of these provisions, the nuts and the two resilient buffers are assembled together by means of the band prior to being mounted on the support, the band then being mounted in the recess in the support, and, by subsequently assembling the worm screw into the two nuts, it is possible to exert prestress on the two resilient buffers. Such prestress makes it possible to take up the slack between the worm screw and the two nuts, and also causes the band to press against the first and second flanges of the support, thereby positioning the two nuts accurately relative to the support.

In preferred embodiments of the invention, any of the following provisions may optionally be used:

the band is made of a plastics material;

the band has two transverse walls interconnected by two longitudinal walls, the two transverse walls being interposed between the two resilient buffers and the first and second flanges of the support;

each transverse wall of the band is provided with at least one end-of-stroke abutment against which the associated nut comes into abutting contact so as to limit the extent to which the corresponding resilient buffer is compressed; and each of the first and second nuts is provided with an abutment member serving to come into abutting contact against the corresponding transverse wall of the band so as to limit the extent to which the corresponding buffer is compressed.

In addition, the invention also provides a motor vehicle seat slide comprising a fixed rail for securing to the vehicle, and a moving rail for supporting a seat proper and mounted to slide along the fixed rail by means of an adjustment mechanism as defined above, the worm screw being mounted on one of the fixed and moving rails, and the support being mounted on the other one of the fixed and moving rails.

According to another advantageous characteristic, the support is fixed to the fixed rail and the longitudinal walls of the band extend in the transverse direction, beyond the first and second flanges of the support so as to come into contact with plane surfaces of the moving rail over the entire stroke of said moving rail.

In addition, the invention also provides a motor vehicle seat having a seat proper mounted to be adjustable longitudinally on at least one slide as defined above.

BRIEF DESCRIPTION OF THE DRAWINGS

Other characteristics and advantages of the invention will appear on reading the following description of two of its embodiments, given by way of non-limiting example, and with reference to the accompanying drawings, in which:

FIG. 3 is a perspective view of the worm screw co-operating with the two nuts-mounted on the support of one of the adjustment mechanisms of FIG. 2;

FIG. 4 is a side view of one of the slides of FIG. 2;

FIG. 5 is an exploded view of the pre-assembled unit of the first embodiment of the adjustment mechanism;

MORE DETAILED DESCRIPTION

In the various figures, like references designate elements that are identical or similar.

Figure 1:
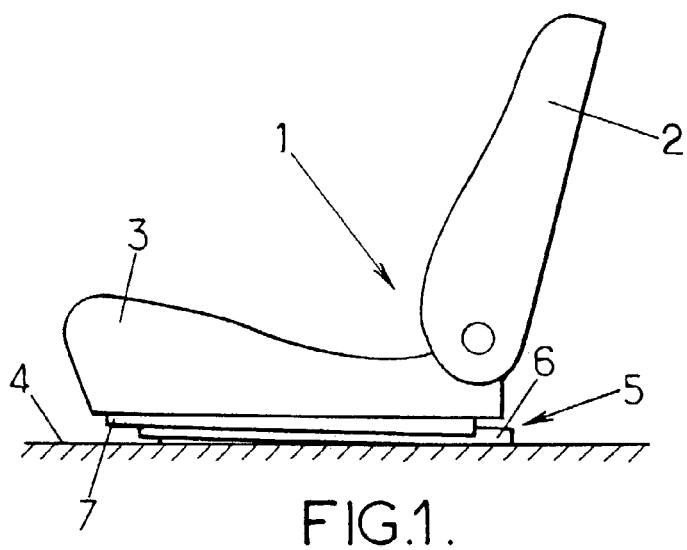
FIG. 1 is a diagrammatic view of a vehicle seat provided with slides, each of which is equipped with an embodiment of an adjustment mechanism of the invention.

FIG. 1 shows a vehicle seat 1, in particular a front seat of a motor vehicle, which seat comprises a backrest 2 mounted on a seat proper 3, itself fixed to the floor 4 of the vehicle via two parallel longitudinal slides 5, only one of which is visible in FIG. 1.

Each of the slides 5 comprises a fixed rail 6 secured to the floor 4 of the vehicle and a moving rail 7 mounted to slide along the fixed rail 6, so as to enable a user of the seat to adjust the longitudinal position of said seat, by means of two identical adjustment mechanisms 10. Each adjustment mechanism 10 is carried by a slide 5, and it is controlled synchronously with the other adjustment mechanism by electrical drive means 11 disposed transversely between the two slides 5.

Figure 2:
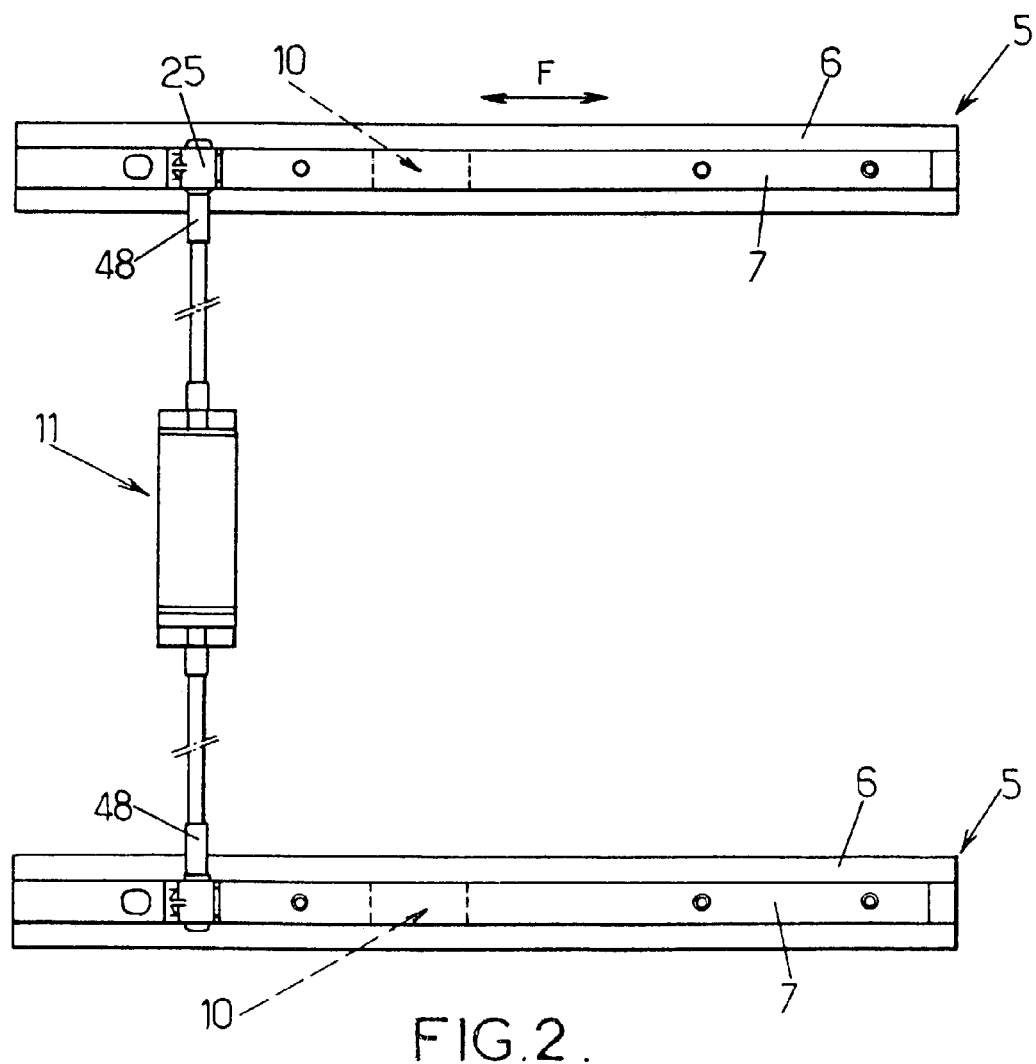
FIG. 2 is a plan view of the slides of FIG. 1, each of which is equipped with an adjustment mechanism of the present invention.

The two adjustment mechanisms 10 enable the longitudinal position of the seat relative to the floor 4 to be adjusted continuously along the axis indicated by the double-headed arrow F, between a rear end position such as the position shown in FIGS. 2 and 4, and a front end position (not shown).

To this end, each adjustment mechanism 10 comprises a nut-forming assembly 12, a support 13, and a worm screw 14 which extends along a longitudinal direction which corresponds to the longitudinal axis F along which the moving rail moves.

In the first embodiment shown in FIGS. 3 to 6, the nut-forming assembly 12 comprises:

- a first nut 15 and a second nut 16 both of which are substantially in the shape of rectangular blocks, which nuts have: respective transverse faces 15a, 16a that are disposed facing towards each other and that are perpendicular to the longitudinal axis of the worm screw 14; respective transverse faces 15b, 16b which are disposed facing away from each other and which are also perpendicular to the longitudinal axis of the worm screw 14; respective bottom faces 15c, 16c facing towards the support 13; and respective top faces 15d, 16d opposite from the bottom faces 15c, 16c and facing towards the seat 1. Each nut 15, 16 also has two longitudinal faces 15e, 16e. The first nut 15 is also provided with a tapped bore 15f and the second nut 16 is provided with a tapped bore 16f, the tapped bores 15f, 16f being designed to be aligned to pass the worm screw 14. At the transverse faces 15a, 16a of the nuts 15, 16, the starts of the threads of the tapped bores 15f, 16f are at different angular positions from one bore to the other, as described in more detail below;

two resilient buffers 17 and 18, e.g. made of rubber, which buffers are provided with through holes 17a, 18a of diameter slightly larger than the diameter of the tapped bores 15f and 16f in the nuts 15 and 16. The two resilient buffers 17 and 18 are, for example, interconnected at their bottom faces via a substantially rectangular intermediate piece 19, it being possible for said intermediate piece 19 to be made integrally with the two resilient buffers 17, 18 (see FIG. 9); and a band 20 made of a plastics material such as polyoxymethylene, which band 20 forms a housing for receiving the two nuts 15 and 16 and the two resilient buffers 17 and 18. The band 20 comprises two longitudinal walls 21 and two transverse walls 22, each of which is provided with a respective through orifice 22a for passing the worm screw 14.

Thus, in order to assemble the adjustment mechanism, firstly the two nuts 15 and 16 are put in place between the two buffers 17 and 18, and then the resulting assembly is inserted into the housing formed by the rigid band 20 so as to form a pre-assembled unit.

When the pre-assembled unit 12 is assembled, the transverse faces 15a and 16a of the nuts 15 and 16 are in abutment against each other, while the buffers 17 and 18 are interposed between the two nuts 15 and 16, and the two transverse walls, 22 of the rigid band 20.

Figure 6:
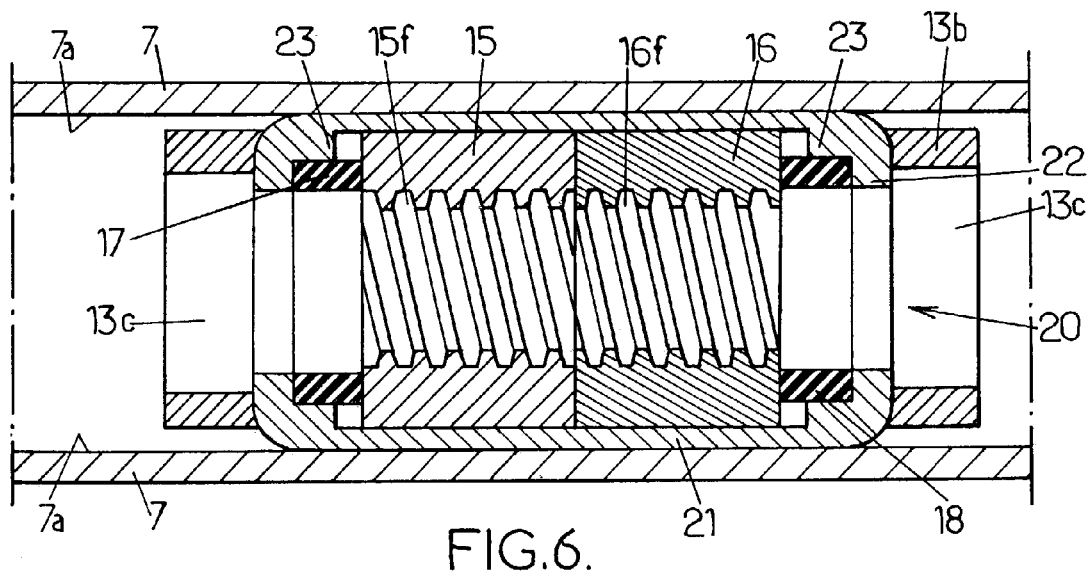
FIG. 6 is a view in section seen looking from above of the first embodiment of the adjustment mechanism, the adjustment mechanism being mounted on a slide.

As can also be seen in FIG. 5, the junctions between the transverse walls 22 and the longitudinal walls 21 of the band are provided with abutment members 23 for receiving the resilient buffers 17 and 18 between them. The two resilient buffers 17 and 18 are of thickness larger than the thickness of the abutment members 23 along the longitudinal axis so that the nuts 15 and 16 are disposed at some distance from the abutment members 23 along the longitudinal axis. However, the thickness of the abutment members 23 of the band 20, along the longitudinal axis, is determined so that the nuts 15 and 16 come into abutment against said abutment members 23 in order to limit the extent to which the two resilient buffers 17 and 18 are compressed, so as not to subject them to premature damage when the moving rail 7 arrives at the front end position or at the rear end position. In addition, when the pre-assembled unit 12 is assembled in this way, the longitudinal faces 15e and 16e of the nuts 15 and 16 are also in abutment against the longitudinal walls 21 of the rigid band 20, as can be seen in FIG. 6.

The pre-assembled unit 12 is designed to be mounted directly on the support 13. For this purpose, the support 13, which, for example, is made of steel, has a web 13a which extends along the longitudinal axis and from which two flanges 13b extend facing each other, each of the flanges being provided with a through hole 13c for passing the worm screw 14 through the transverse flanges 13b.

The length of the web 13a of the support 13 is substantially equal to the combined length of the two nuts 15 and 16 plus the combined thickness of the two buffers 17 and 18 and the combined thickness of the transverse walls 22 of the rigid band 21, so that the transverse walls 22 abut against the transverse flanges 13b of the support 13.

The worm screw 14 is screwed into the two nuts 15 and 16 by passing through the flanges 13b of the support 13 and through the transverse walls 22 of the band 20 and through the buffers 17 and 18.

The worm screw 14 is constrained to move longitudinally with the moving rail 7 (see FIG. 4), and it has a rear end 14a and a front end 14b. The rear end 14a is received in a cradle 24 fixed to one end of the moving rail 7, and the front end 14b of the worm screw 14 is constrained to rotate with a gear 25 that belongs to the electrical drive means 11.

As can be seen in FIG. 6, and as already described above, the two nuts 15 and 16 are provided with respective tapped bores 15f and 16f which, at the facing faces 15a, 16a of the nuts, have threads that start at different angular positions so that, when the worm screw 14 is screwed into the nuts, said tapped bores cause the nuts 15 and 16 to move apart from each other.

Figure 9:
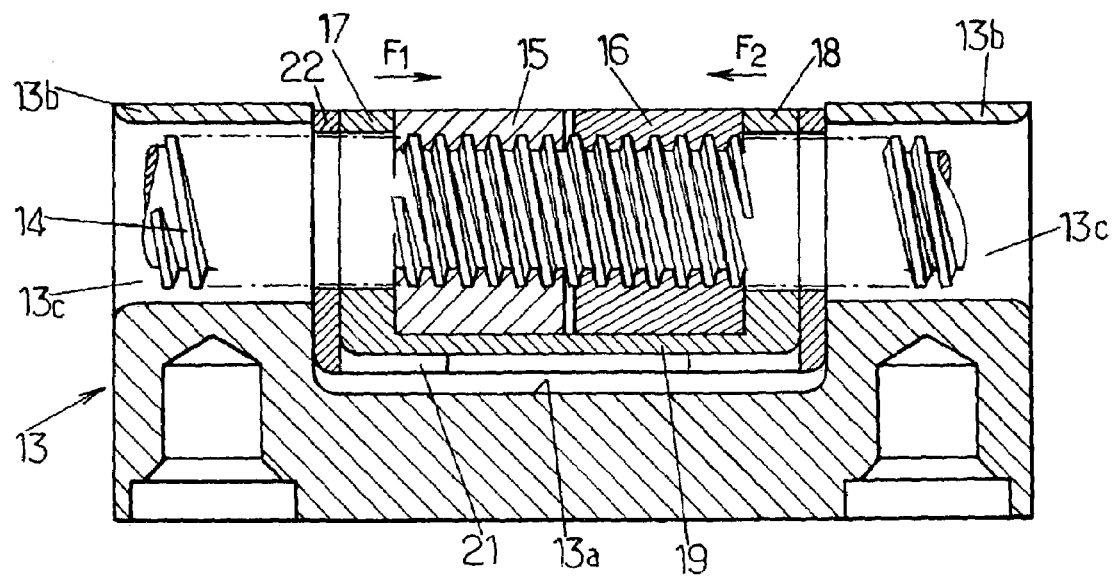
FIG. 9 is a view in section seen looking from the side of the adjustment mechanism of the invention.

As can be seen in FIGS. 6 and 9, the different angular positions of the starts of the threads in the two tapped bores 15f and 16f of the nuts 15 and 16 generate discontinuity in the threads of the tapped bores 15f and 16f, which, when the worm screw 14 exits from the tapped bore 15f and enters the tapped bore 16f, causes a gap to appear between the two nuts 15 and 16.

The gap between the two nuts 15 and 16 causes the two resilient buffers 17 and 18 to be elastically deformed, which firstly enables the resilient buffer 17 to push the nut 15 away in the direction indicated by arrow F1 (FIG. 9), thereby causing the thread of the tapped bore 15f to be press against the thread of the worm screw 14, and secondly enables the resilient buffer 18 to push the nut 16 away in the direction indicated by arrow F2 (FIG. 9) so as to cause the thread of the tapped bore 16f in the nut 16 to press against the thread of the worm screw 14 in the direction indicated by arrow F2.

In addition, said gap between the nuts 15 and 16 also makes it possible, by means of the two resilient buffers 17 and 18 deforming, to cause the transverse walls 22 of the band 20 to press against the two branches 13b of the support 13. Thus, when the worm screw 14 is screwed into the two nuts 15 and 16, the gap between the two nuts makes it possible to take up the slack between the threads in the tapped bores 15f and 16f and the thread on the worm screw 14, while also making it possible to cause the transverse walls 22 of the band 20 to press against the transverse flanges 13b of the support 13 so that the pre-stress exerted on the resilient buffers 17 and 18 is provided only when the worm screw 14 is screwed into the nuts. Via its thread, the worm screw defines the exact width of the gap between the two nuts 17 and 18.

Advantageously, the semi-rigid band 20 is made of a plastics material so that, while the resilient buffers are being prestressed, the steel-on-plastic contact between the support 13 and the band 20 enables the two nuts 15 and 16 to move to some extent transversely and parallel to the web 13a, and also vertically.

Thus, when the worm screw 14 is turned via the gear 48, it moves the moving rail 7 relative to the fixed rail 6 continuously, rectilinearly, and longitudinally in one direction or the other along the axis F, between the rear end position and the front end position. By means of the presence of the plastics band 20 and because the slack between the worm screw and the nuts 15 and 16 is taken up, the two nuts 15 and 16 follow the movements of the worm screw which itself is subjected to the relative movements of the fixed and the moving rails. Naturally, the two nuts 15 and 16 can also move to some extent longitudinally, such movements being absorbed by the resilient buffers 17 and 18.

Advantageously, the transverse walls 22 of the band 20 are of width larger than the width of the transverse flanges 13b of the support 13 so that the longitudinal walls 21 of the band 20 extend slightly beyond the transverse flanges 13b. Thus, when the support 13 is put in place on the fixed rail 6 (see FIGS. 6 and 8), the longitudinal walls 21 of the plastics band 20 are in abutment against the female rail 7, or more exactly against the plane walls 7a of the moving rail 7.

The plastics band 20 thus serves as an anti-rotation member for preventing the two nuts 15 and 16 from turning, and makes it possible for the two nuts to be laterally positioned accurately by abutting against the vertical walls 7a of the moving rail 7, thereby limiting positioning dispersion between the axis of the worm screw 14 and uncontrolled turning of the nuts.

Figure 8:
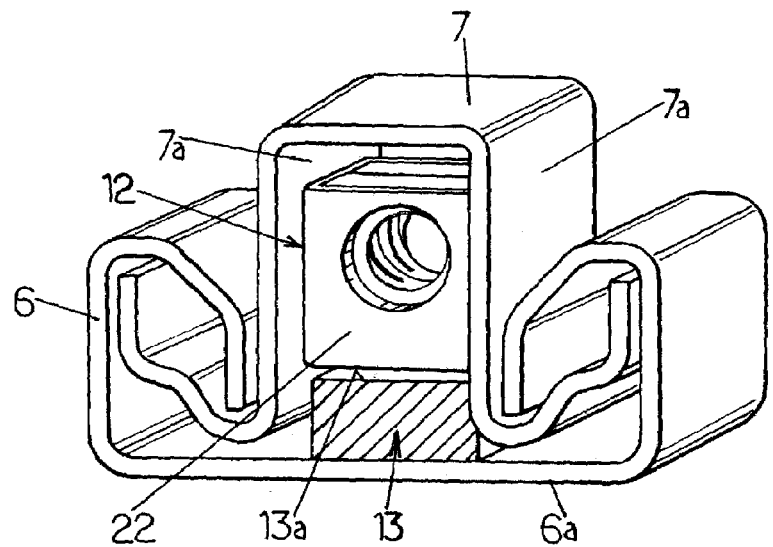
FIG. 8 is a view partially in section and partially in perspective of the pre-assembled unit of the adjustment mechanism, said pre-assembled unit being disposed facing the web of the support, and being disposed inside a slide.

As can also be seen in FIGS. 8 and 9, when the support 13 is fixed to the web 6a of the fixed rail 6 and when the two nuts 15 and 16 co-operate with the worm screw 14, a gap remains between the web 13a of the support and the bottom portion of the band 20. The gap allows the two nuts 15 and 16 to move vertically relative to the web 13a of the support 13.

Figure 7:
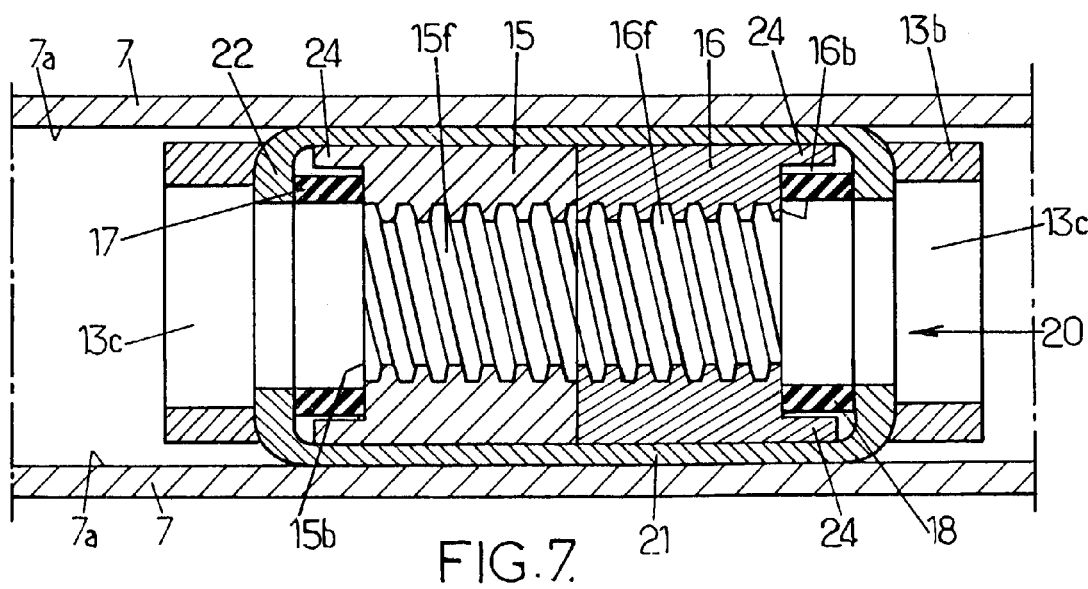
FIG. 7 is a view in section seen looking from above of a second embodiment of the adjustment mechanism, also mounted on a slide.

In a second embodiment shown in FIG. 7, the abutment members are not provided on the plastics band 20, but rather they are provided directly on the transverse faces 15b and 16b of the nuts 15 and 16. More exactly, the transverse faces 15b and 16b are provided with end fins 24 defining setbacks in which respective ones of the resilient buffers 17 and 18 are received. Said end fins 24 serve to come into abutment against the transverse walls 22 of the band 20 in order to limit the movement of the two nuts 15 and 16, thereby limiting the extent to which the two resilient buffers 17 and 18 are compressed.

What is claimed is:

1. An adjustment mechanism for a slide of a motor vehicle seat, the adjustment mechanism comprising:

a drive worm screw extending in a longitudinal direction;

a first nut and a second nut rotatably receiving the worm screw, the first and second nuts having respective first and second transverse faces perpendicular to the longitudinal direction of the worm screw and disposed facing each other;

a support comprising a web from which first and second flanges extend that face each other and that co-operate with said web to form a housing for receiving the two nuts, the worm screw being mounted to turn relative to the support so as cause the screw and the support to move in translation relative to each other; and two resilient buffers received respectively between the first nut and the first flange of the support, and between the second nut and the second flange of the support;

said adjustment mechanism further comprising a band forming a housing for receiving the two nuts and the two buffers and thereby forming a pre-assembled unit prior to being mounted in the recess of the support, the first and second transverse face of the first and second nuts being in abutment against each other prior to screwing the worm screw into the two nuts, and the first and second nuts have respective first and second tapped bores which, at the first and second transverse faces, have threads that start at different angular positions, so that screwing the worm screw into the nuts generates both a gap between the first and second nuts and elastic deformation of the two buffers, making it possible firstly to cause the threads of the first and second tapped bores to press against the worm screw, and secondly to cause the band to press against the first and second flanges of the support.

2. A mechanism according to claim 1, in which the band is made of a plastics material.

3. A mechanism according to claim 1, in which the band has two transverse walls interconnected by two longitudinal walls, the two transverse walls being interposed between the two resilient buffers and the first and second flanges of the support.

4. A mechanism according to claim 3, in which each transverse wall of the band is provided with at least one end-of-stroke abutment against which the associated nut comes into abutting contact so as to limit the extent to which the corresponding resilient buffer is compressed.

5. A mechanism according to claim 3, in which each of the first and second nuts is provided with an abutment member serving to come into abutting contact against the corresponding transverse wall of the band so as to limit the extent to which the corresponding buffer is compressed.

6. A motor vehicle seat slide comprising a fixed rail for securing to the vehicle, and a moving rail for supporting a seat proper and mounted to slide along the fixed rail by means of an adjustment mechanism according to claim 1, the worm screw being mounted on one of the fixed and moving rails, and the support being mounted on the other one of the fixed and moving rails.

7. A slide according to claim 6, in which the support is fixed to the fixed rail and the longitudinal walls of the band extend in the transverse direction, beyond the first and second flanges of the support so as to come into contact with plane surfaces of the moving rail over the entire stroke of said moving rail.

8. A motor vehicle seat having a seat proper mounted to be adjustable longitudinally on at least one slide according to claim 6.

* * * * *